(12) United States Patent
Gerber et al.

(10) Patent No.: US 8,817,653 B2
(45) Date of Patent: Aug. 26, 2014

(54) DETECTING IRREGULAR RETRANSMISSIONS

(75) Inventors: Alexandre Gerber, Madison, NJ (US); Zhuoqing Mao, Ann Arbor, MI (US); Feng Qian, Ann Arbor, MI (US); Subhabrata Sen, New Providence, NJ (US); Oliver Spatscheck, Randolph, NJ (US); Walter Willinger, Madison, NJ (US)

(73) Assignees: AT&T Intellectual Property I, L.P., Atlanta, GA (US); The Regents of the University of Michigan, Ann Arbor, MI (US)

( * ) Notice: Subject to any disclaimer, the term of this patent is extended or adjusted under 35 U.S.C. 154(b) by 880 days.

(21) Appl. No.: 12/609,713

(22) Filed: Oct. 30, 2009

(65) Prior Publication Data
US 2011/0103256 A1    May 5, 2011

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC ........................................................ 370/253

(58) Field of Classification Search
USPC ........................................................ 370/253
See application file for complete search history.

(56) References Cited

U.S. PATENT DOCUMENTS

| | | | |
|---|---|---|---|
| 2002/0120727 A1* | 8/2002 | Curley et al. | 709/223 |
| 2003/0135784 A1* | 7/2003 | Yamaguchi et al. | 714/18 |
| 2008/0285496 A1* | 11/2008 | Fuchs et al. | 370/311 |
| 2009/0074083 A1* | 3/2009 | Wakutsu | 375/240.28 |
| 2009/0147765 A1* | 6/2009 | Chen et al. | 370/345 |
| 2009/0276518 A1* | 11/2009 | Burkard et al. | 709/224 |
| 2010/0083067 A1* | 4/2010 | Fujimoto et al. | 714/748 |

* cited by examiner

*Primary Examiner* — Jason Mattis
*Assistant Examiner* — Adnan Baig
(74) *Attorney, Agent, or Firm* — Hartman & Citrin LLC

(57) ABSTRACT

A packet trace is received. Transmitted bytes and retransmitted bytes are identified in the packet trace. Upon identifying the transmitted bytes and the retransmitted bytes in the packet trace, one or more time-rate pairs are determined from the packet trace. The time-rate pairs are plotted on a rate tracking graph.

18 Claims, 4 Drawing Sheets

200

1: for all $b \in T$ do
2:    if $\exists$ byte $b'$: $(b'.seq = b.seq) \wedge (b'.ts > b.ts)$ then
3:       $b.lbl \leftarrow 0$; else $b.lbl \leftarrow 1$; endif
4: end for
5: $head \leftarrow 0$; $tail \leftarrow 1$
6: while $tail \leq T.len$ do
7:    $head \leftarrow head + 1$
8:    while $(tail \leq T.len) \wedge (\sum_{i=head}^{tail} byte(i).lbl < W)$ do
9:       $tail \leftarrow tail + 1$
10:    end while
11:    if $tail \leq T.len$ then
12:       $r = tail - head - W$; $t = byte(tail).ts - byte(head).ts$
13:       Plot $(t, r)$ on Rate Tracking Graph
14:    end if
15: end while

*Fig. 2*

DETECTING IRREGULAR RETRANSMISSIONS

BACKGROUND

This application relates generally to the field of computer networks. More specifically, the disclosure provided herein relates to detecting irregular retransmissions in a Transmission Control Protocol ("TCP") data flow.

Modern Internet Protocol ("IP") networks carry traffic from a diverse set of applications, ranging from non-real-time applications to real-time applications. Generally, real-time applications are those applications that meet a real-time constraint, i.e., a time limit in which a system responds to a request or event. Examples of non-real-time applications include email and bulk data transfers (e.g., File Transfer Protocol ("FTP") file transfers). Examples of real-time applications include Voice over IP ("VoIP"), Internet Protocol Television ("IPTV"), Internet games, and critical business transactions.

Historically, non-real-time applications dominated the Internet landscape. However, in recent years, real-time applications have become increasingly popular. A number of factors have contributed to this material shift from non-real-time applications to real-time applications. These factors include the rapid deployment of backbone links with one to two orders of magnitude more network capacity, the increasing reach of broadband access networks, the emergence of bandwidth-intensive streaming applications, and an economic and technological move towards transitioning even mission-critical applications from dedicated networks to the Internet through architectures like Virtual Private Networks ("VPNs").

While the applications, as well as the constraints upon which the applications operate, have multiplied, TCP has remained the dominant transport layer protocol in IP networks. In particular, TCP is widely adopted by many new applications and accounts for the majority of current traffic on the Internet. However, TCP was originally designed to support a reliable, in-order delivery of a byte stream between two endpoints in a bandwidth friendly manner. In this regard, TCP is not an ideal transport protocol for real-time applications.

A number of considerations have contributed to the dominance of TCP in IP networks. These considerations include the following: (1) TCP is deployed nearly ubiquitously; (2) TCP helps offload many low-level transport details with which an application developer would otherwise have to contend; and (3) TCP packets are routinely allowed by firewalls, which typically block non-TCP data flows. Further, fueled by the need to support more stringent performance requirements of emerging applications, developers have created various TCP variants, such as FAST, HSTCP, and CUBIC. Some vendors have also promoted acceleration hardware that offers propriety optimizations to TCP.

While TCP continues to dominate IP networks, little is known or studied about the behavior of TCP traffic on the Internet. Understanding the behavior of TCP may be vital for proper management, provisioning, and capacity planning of IP networks. Further, understanding the behavior of TCP may provide insights to guide network protocol design.

SUMMARY

Embodiments of the disclosure presented herein include methods, systems, and computer-readable media for detecting an irregular retransmission. According to one aspect, a method for detecting an irregular retransmission is provided. According to the method, a packet trace is received. Transmitted bytes and retransmitted bytes are identified in the packet trace. Upon identifying the transmitted bytes and the retransmitted bytes in the packet trace, one or more time-rate pairs are determined from the packet trace. The time-rate pairs are plotted on a rate tracking graph.

According to another aspect, a system for detecting an irregular retransmission is provided. The system includes a memory and a processor functionally coupled to the memory. The memory stores a program containing code for detecting the irregular retransmission. The processor is responsive to computer-executable instructions contained in the program and configured to perform the following operations. A packet trace is received. Transmitted bytes and retransmitted bytes are identified in the packet trace. Upon identifying the transmitted bytes and the retransmitted bytes in the packet trace, one or more time-rate pairs are determined from the packet trace. The time-rate pairs are plotted on a rate tracking graph.

According to yet another aspect, a computer-readable medium having instructions stored thereon for execution by a processor to perform a method for v is provided. According to the method, a packet trace is received. Transmitted bytes and retransmitted bytes are identified in the packet trace. Upon identifying the transmitted bytes and the retransmitted bytes in the packet trace, one or more time-rate pairs are determined from the packet trace. The time-rate pairs are plotted on a rate tracking graph.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIG. 2 is a diagram illustrating exemplary pseudo-code for detecting an irregular retransmission, in accordance with some embodiments.

DETAILED DESCRIPTION

Figure 1:
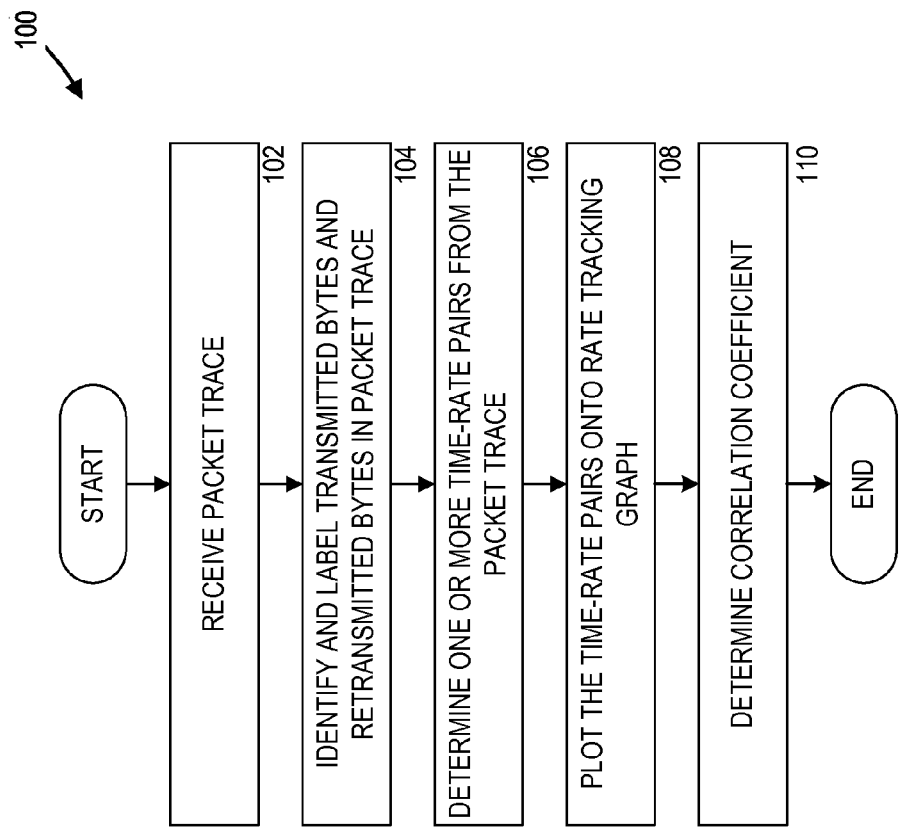
FIG. 1 is a flow diagram illustrating an exemplary method for detecting an irregular retransmission, in accordance with some embodiments.

The following detailed description is directed to methods, systems, and computer-readable media for detecting irregular retransmissions in a Transmission Control Protocol ("TCP") data flow. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, specific embodiments, or examples. As used herein, the transmission of data packets over TCP may be referred to as TCP flow. Prior to a TCP flow, a TCP sender may establish a connection with a TCP receiver. A TCP sender typically establishes a connection with a TCP receiver by way of a three-way handshake. In summary, the three-way handshake operates as follows: (1) the TCP sender sends SYN to the TCP receiver; (2) the TCP receiver replies with SYN/ACK to the TCP sender; and (3) the TCP sender sends ACK back to the TCP receiver. The three-way handshake is well known to those skilled in the art, and as such, will not be described in further detail herein.

The three-way handshake may synchronize sequence numbers for communications between the TCP sender and the TCP receiver. A sequence number may refer to a 32-bit field in the TCP header that identifies each byte of data in a data segment. The sequence number may identify the order of the bytes sent from each computer so that the data can be reconstructed in order, regardless of any fragmentation, disordering, or packet loss that may occur during transmission.

When the TCP sender transmits a data segment to the TCP receiver, the TCP header may include a particular sequence number. In an exemplary implementation, the first byte of the data may be assigned this sequence number. The sequence number may then be incremented for each subsequent byte of the data following the first byte. Thus, for example, if a data segment includes four bytes of data and a sequence number 1000, then the first byte of data may be assigned the sequence number 1000, the second byte of data may be assigned a sequence number 1001, the third byte of data may be assigned a sequence number 1002, and the fourth byte of data may be assigned a sequence number 1003.

Upon receiving the data segment from the TCP sender, the TCP receiver may transmit an acknowledgment (also referred to as an "ACK") verifying the data transmission back to the TCP sender. In an exemplary implementation, the acknowledgment may specify the sequence number of the next byte that the TCP receiver expects to receive. In this way, the acknowledgment may indicate whether the data transmission was successful. In the previous example where the data segment includes four bytes of data and the sequence number 1000, if the data transmission is successful, then the acknowledgment transmitted from the TCP receiver back to the TCP sender will specify the sequence number of the next byte that the TCP receiver expects to receive is sequence number 1004, which follows the fourth byte of data having the sequence number 1003. However, if the acknowledgment transmitted from the TCP receiver back to the TCP sender specifies, for example, the sequence number 1002, then the TCP sender can infer that the data transmission was unsuccessful.

With regard to TCP, a congestion window generally refers to the maximum amount of data (i.e., the number of bytes) that the TCP sender can send to the TCP receiver prior to the TCP sender receiving any ACKs from the TCP receiver. In an exemplary implementation of the congestion window, when the TCP sender sends X amount of data, the congestion window may be reduced by this X amount of data. Once the congestion window reaches a zero value, no more data can be transmitted. When the TCP receiver responds with an ACK verifying that Y amount of data has been received (through the use of sequence numbers, as previously described), the congestion window may be increased by this Y amount of data. In this way, TCP can manage the rate of data transmission between the TCP sender and the TCP receiver in order to ensure reliable data transmissions.

As used herein, a transmission refers to the first instance that data is transmitted from the TCP sender to the TCP receiver. If the transmission is successful and reaches the TCP receiver, then the transmission is not repeated. However, if the transmission is unsuccessful and does not reach the TCP receiver for some reason, then the transmission is repeated. As used herein, a retransmission refers to an additional instance that the data is retransmitted from the TCP sender to the TCP receiver.

A transmission may be unsuccessful when congestion is present on the network. In particular, congestion may be caused when the TCP sender sends an excessive amount of data to the TCP receiver at a given time. The congestion may cause at least some of the data to be lost before it reaches the TCP receiver, thereby causing the TCP sender to initiate a retransmission of the lost data to the TCP receiver. In order to address the potential for congestion on the network, the Request for Comments ("RFC") memorandum for TCP implementations requires that when a TCP sender performs retransmissions, the TCP sender also decreases its send rate for transmissions. By decreasing the send rate of transmissions during retransmissions, the TCP sender reduces any congestion on the network and addresses any data loss that may be caused by the congestion. As used herein, a send rate refers to the amount of data that is sent from the TCP sender to the TCP receiver within a given amount of time during a transmission. Also as used herein, a retransmission rate refers to the amount of data that is sent from the TCP sender to the TCP receiver within a given amount of time during a retransmission.

In some TCP instances, the TCP sender may not slow down its rate of transmissions during retransmissions. As used herein, an irregular transmission refers to a retransmission where the TCP sender does not reduce its send rate for transmissions. Embodiments described herein provide a tool referred to herein as a rate tracking graph ("RTG"). The RTG provides a methodology for detecting irregular transmissions within a data flow between the TCP sender and the TCP receiver. RTG is based on the underlying observation that holds for TCP implementations—i.e., when retransmission rate increases, the sender should decrease the upper bound of the TCP sender's send rate by reducing the congestion window. Such an inverse correlation between the retransmission rate and the upper bound of the TCP sender's send rate also implies a positive correlation between the retransmission rate r and time t required to successfully transfer a fixed size of data. As described in greater detail below, RTG essentially samples pairs of (t, r), by sliding a tracking window W along a data flow in order to test whether t and r exhibit a strong positive correlation. A strong positive correlation between t and r for a sufficient sample size may strongly suggest an irregular transmission in the data flow.

Referring now to the drawings, in which like numerals represent like elements through the several figures, FIG. 1 is a flow diagram illustrating an exemplary method 100 for detecting irregular transmissions, according to some embodiments. The method 100 begins at operation 102, where a packet trace is received. The packet trace may be recorded by a packet monitor configured at some point between a TCP sender and a TCP receiver. The packet trace may include arrival times (e.g., timestamps) for data packets transmitted between the TCP sender and the TCP receiver. The packet trace may be a unidirectional or a bi-directional packet trace. When the packet trace is received, the method 100 proceeds to operation 104.

At operation 104, transmitted bytes and retransmitted bytes in the packet trace are identified and labeled. The transmitted bytes refer to those bytes in the packet trace that are being transmitted from the TCP sender to the TCP receiver for the first time. The retransmitted bytes refer to those bytes in the packet trace that are being retransmitted from the TCP sender to the TCP receiver. The transmitted bytes and the retransmitted bytes may be identified by comparing sequence numbers and timestamps of the bytes. For example, if a byte is repeated, then a repeated byte will have the same sequence number but a later timestamp. In one embodiment, the transmitted bytes are assigned a "1" value, and the retransmitted bytes are assigned a "0" value. When the transmitted bytes and the retransmitted bytes are identified and labeled, then the method 100 proceeds to operation 106.

At operation 106, one or more time-rate pairs are determined from the packet trace. Given a fixed size of a tracking window W, one or more time-rate pairs, (t, r), in the packet trace are sampled by sliding the tracking window W of varying length t along the packet trace. That is, the time t required to successfully transfer a fixed size of data also represents the length t of the tracking window W. In some embodiments, the tracking window W may be 50 kilobytes ("KB"), 100 KB, 200 KB, and 400 KB. The size of the tracking window W may be configured such that it is large enough to include more than one round trip time ("RTT") and small enough to cover various retransmission rates. As used herein, the fixed size of the tracking window W specifies the number the number of transmitted bytes (i.e., non-retransmitted bytes) in the tracking window W. For example, when a 50 KB tracking window W slides along the packet trace, the tracking window W encompasses 50 KB of transmitted bytes. Although the tracking window W is a fixed size, the length t may vary depending on the number of retransmitted bytes in the packet trace. In particular, a greater number of retransmitted bytes in the packet trace may increase the length t of the tracking window W.

According to embodiments, a time-rate pair is specified for each length t that the tracking window W encompasses a portion of the packet trace while the tracking window W slides along the packet trace incrementally (i.e., from the first byte to the second byte, from the second byte to the third byte, etc.). When the tracking window W of length t encompasses a portion of the packet trace, the retransmission rate r is computed for that portion of the packet trace encompassed by the tracking window W. In one embodiment, the retransmission rate r is computed by dividing the number of retransmitted bytes encompassed by the tracking window W by the size of the tracking window W. The time-rate pairs may be detected and recorded until the tracking window W slides to the end of the packet trace (i.e. when each byte in the packet trace has been enumerated). When one or more time-rate pairs are determined from the packet trace, the method 100 proceeds to operation 108.

At operation 108, each time-rate pair that was determined is plotted on a RTG. In one embodiment, the RTG is a graph where one axis represents the retransmission rate r, and the other axis represents the time t. The method 100 then proceeds to operation 110, where a correlation coefficient is determined based on the plotted RTG. The correlation coefficient is a well-known statistics concept that provides a quantity that gives the quality of a least squares fitting to the time-rate pairs in the plotted RTG. Because the correlation coefficient is well-known to those skilled in the art, the correlation coefficient will not be described herein in greater detail.

According to embodiments, a small positive correlation coefficient or a negative correlation coefficient indicates an irregular transmission. In one embodiment, a correlation coefficient less than 0.1 or another suitable threshold indicates an irregular transmission. In further embodiments, other ranges of the correlation coefficient may be utilized as contemplated by those skilled in the art.

In some instances, the TCP sender may experience long pauses that increase the time t. For example, for interactive web-based applications, a server may be idle for seconds with no data to send. In such instances, an entropy-based cutting process, as described below, may be utilized in order to remove large gaps by separating the packet trace into segments. RTGs may then be generated for each sufficiently large segment (e.g., greater than 1 megabyte ("MB")) having data packets with inter-arrival times ("IATs") less intermittent than those in the packet trace. When the TCP sender transmits data packets to the TCP receiver, a TCP packet monitor placed between the TCP sender and the TCP receiver may record a timestamp for each data packet within a packet trace. The IATs refer to the "gaps" between each of the timestamps. In one embodiment, the IAT-entropy may be defined as the following computation:

$$E_{IAT} = \sum_{P_i, P_{i+1}} \frac{iat(P_i, P_{i+1})}{d} \log\left(\frac{iat(P_i, P_{i+1})}{d}\right)$$

where $P_i$ denotes the ith packet, and d denotes the flow duration. The computation iteratively cuts a segment S into $S_1$ and $S_2$ as long as $\max\{E_{IAT}(S_1), E_{IAT}(S_2)\} > E_{IAT}(S)$.

FIG. 2 is a diagram illustrating an exemplary pseudo-code 200 implementing the method 100 for detecting irregular retransmissions. The pseudo-code 200 includes a first line 202, a second line 204, a third line 206, a fourth line 208, a fifth line 210, a sixth line 212, a seventh line 214, an eighth line 216, a ninth line 218, a tenth line 220, an eleventh line 222, a twelfth line 224, a thirteenth line 226, a fourteenth line 228, and a fifteenth line 230. The input into the pseudo-code 200 may be a unidirectional packet trace T, and a tracking window may have a size W. In one embodiment, the packet trace T has greater than 10% retransmissions or another suitable threshold.

In the first line 202, the second line 204, the third line 206, and the fourth line 208, a for-loop is provided whereby each byte b in the packet trace T is labeled as retransmitted byte or a transmitted byte. The variable "seq" denotes the sequence number of the corresponding byte b, and the variable "ts" refers to the timestamp of the corresponding byte b. If a byte b is repeated, then a repeated byte b' will have the same sequence number seq but a later timestamp ts. As shown in the third line 206, a retransmitted byte is identified by a "0" value, whereas a transmitted byte is identified by a "1" value.

The fifth line 210 initializes the tracking window, which includes a head and a tail. The sixth line 212 begins a first while-loop where rate-time pairs are computed until the tracking window slides to the end of the packet trace T. In the seventh line 214, the head is incremented by one. In the eighth line 216, the ninth line 218, and the tenth line 220, a second while-loop is provided whereby the tail is incremented until the tracking window encompasses the number of transmitted bytes as specified by the size W. Thus, at the tenth line 220, a tracking window of an adequate length has been formed and encompasses a portion of the packet trace T. In the eleventh line 222, the twelfth line 224, the thirteenth line 226, and the fourteenth line 228, an if-then statement is provided whereby (1) a rate-time pair having a retransmission rate r and a time t is computed for the tracking window that has been formed, and (2) the rate-time pair is plotted onto a RTG. The fifteenth line 230 ends the first while-loop.

Figures 3A, 3B:
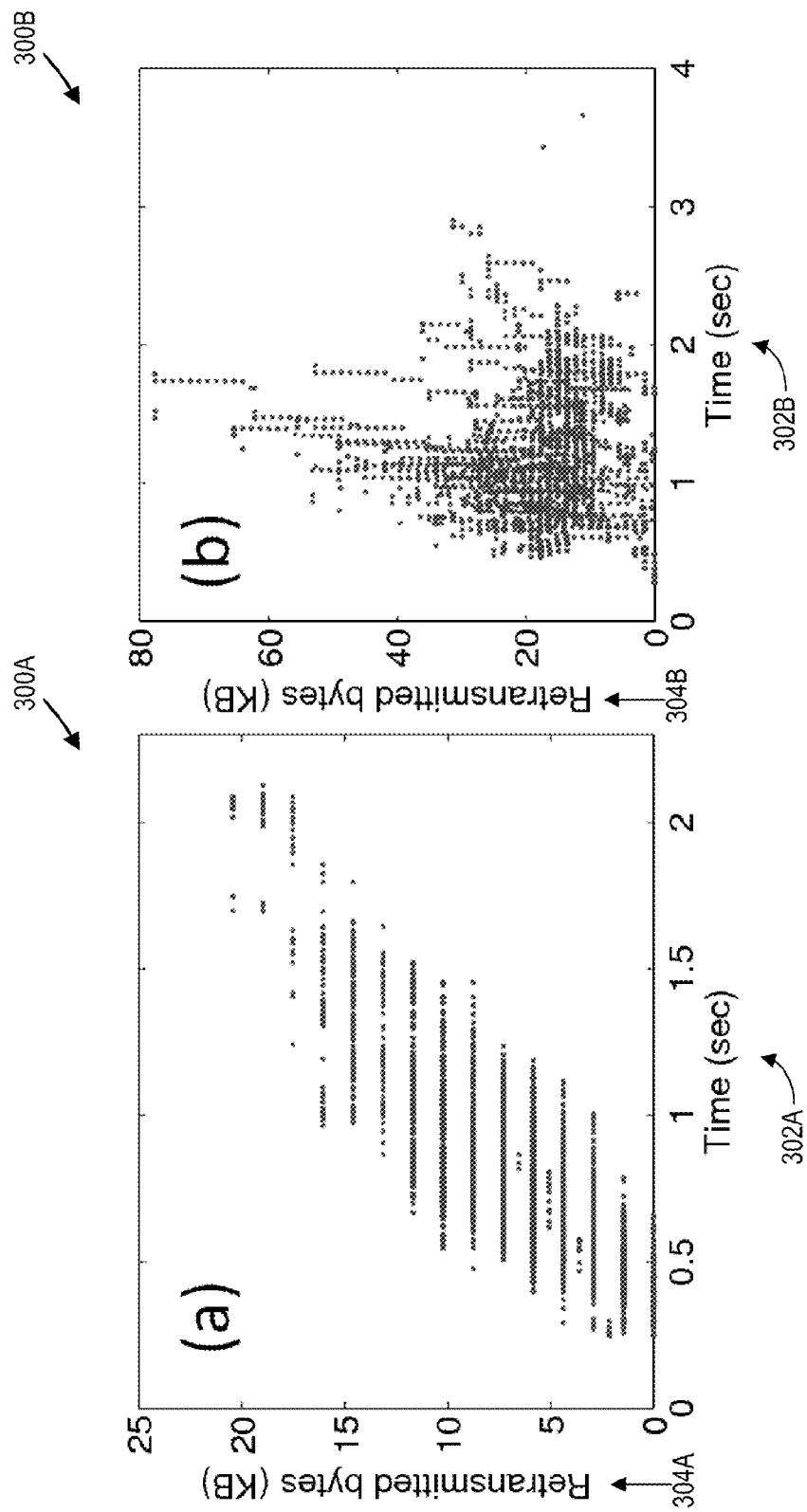
FIGS. 3A and 3B are diagrams illustrating exemplary rate tracking graphs, in accordance with some embodiments.

FIGS. 3A and 3B are diagrams illustrating exemplary RTGs 300A, 300B, in accordance with some embodiments. In FIG. 3A, the RTG 300A includes an x-axis 302A that denotes a time t and a y-axis 304A that denotes a retransmission rate r. The size W of the tracking window in the RTG 300A is 50 KB. In FIG. 3B, the RTG 300B includes an x-axis 302B that denotes a time t and a y-axis 304B that denotes a retransmission rate r. The size W of the tracking window in the RTG 300B is 100 KB. Multiple time-rate pairs have been plotted onto the RTGs 300A, 300B. The RTG 300A illustrates a regular retransmission having a correlation coefficient of 0.88. The RTG 300B illustrates an irregular retransmission having a correlation coefficient of −0.04.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Figure 4:
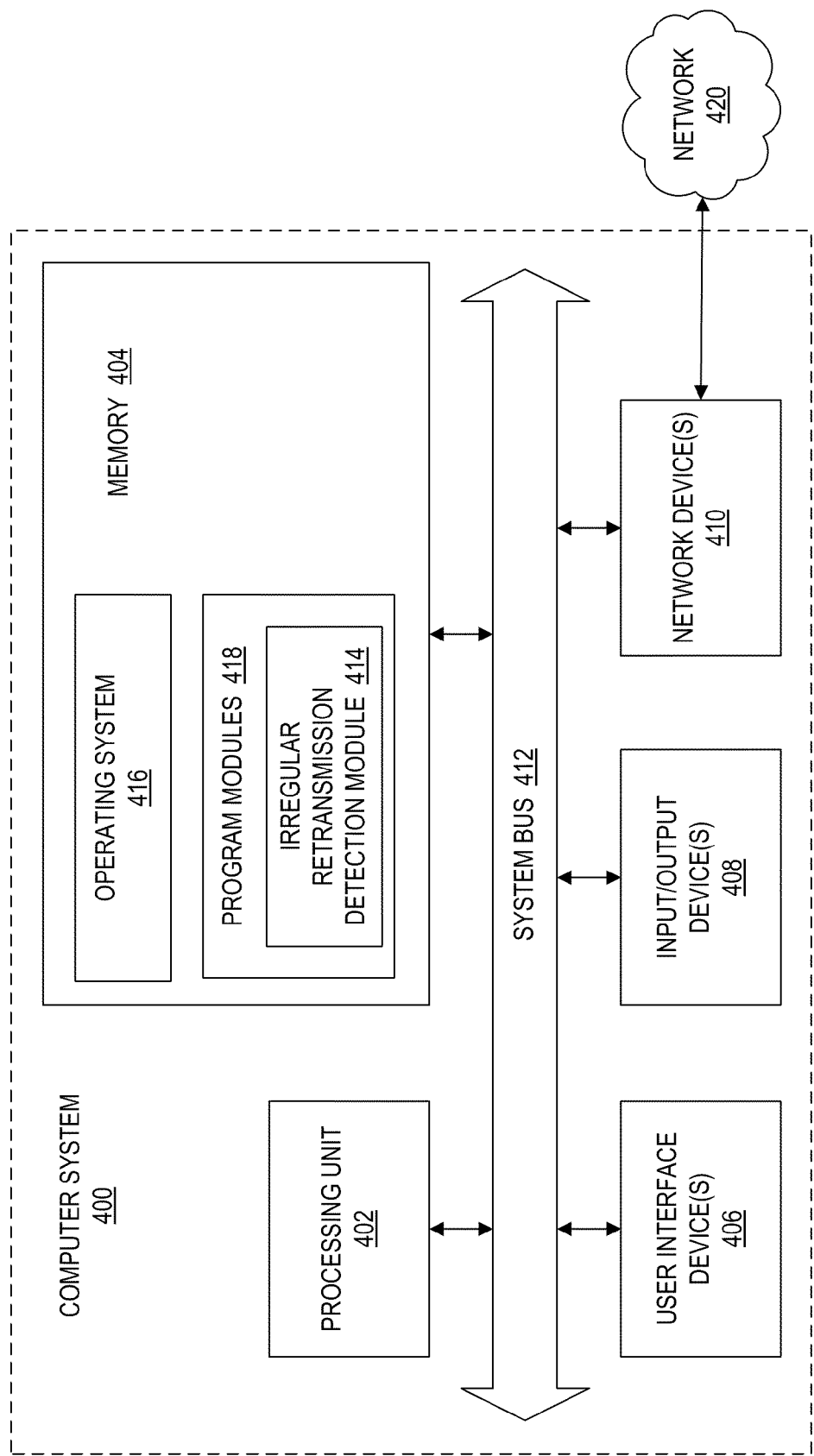
FIG. 4 is a block diagram illustrating an exemplary computer system configured to detect an irregular retransmission, in accordance with some embodiments.

FIG. 4 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 4 is a block diagram illustrating a computer system 400 configured to detect irregular retransmissions, in accordance with embodiments. The computer system 400 includes a processing unit 402, a memory 404, one or more user interface devices 406, one or more input/output ("I/O") devices 408, and one or more network devices 410, each of which is operatively connected to a system bus 412. The bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 404 communicates with the processing unit 402 via the system bus 412. In one embodiment, the memory 404 is operatively connected to a memory controller (not shown) that enables communication with the processing unit 402 via the system bus 412. The memory 404 includes an operating system 416 and one or more program modules 418, according to exemplary embodiments. Examples of operating systems, such as the operating system 416, include, but are not limited to, WINDOWS, WINDOWS CE, and WINDOWS MOBILE from MICROSOFT CORPORATION, LINUX, SYMBIAN from SYMBIAN LIMITED, BREW from QUALCOMM CORPORATION, MAC OS from APPLE CORPORATION, and FREEBSD operating system. The program modules 418 include an irregular retransmission detection module 414. In some embodiments, the irregular retransmission detection module 414 is embodied in computer-readable media containing instructions that, when executed by the processing unit 402, performs the method 100 and/or the pseudo-code 200 of FIGS. 1 and 2, respectively. According to embodiments, the program modules 418 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400.

The user interface devices 406 may include one or more devices with which a user accesses the computer system 400. The user interface devices 406 may include, but are not limited to, computers, servers, personal digital assistants, cellular phones, or any suitable computing devices. The I/O devices 408 enable a user to interface with the program modules 418. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer.

The network devices 410 enable the computer system 400 to communicate with other networks or remote systems via the network 420. Examples of the network devices 410 may include, but are not limited to, a modem, a radio frequency ("RF") or infrared ("IR") transceiver, a telephonic interface, a bridge, a router, or a network card. The network 420 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 420 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for detecting an irregular retransmission, the method comprising:
   receiving, by a processor, a packet trace from a packet monitor positioned between a sender and a receiver, the packet trace indicating an arrival time for a data packet transmitted between a sender and a receiver;
   identifying, by the processor, transmitted bytes and retransmitted bytes in the packet trace;
   upon identifying the transmitted bytes and the retransmitted bytes in the packet trace, determining, by the processor, time-rate pairs from the packet trace;
   plotting, by the processor, the time-rate pairs on a rate tracking graph;
   determining, by the processor, a correlation coefficient based on the rate tracking graph as plotted; and
   if the correlation coefficient is less than a threshold, determining, by the processor, that the packet trace indicates an irregular retransmission, wherein the irregular retransmission indicates a failure of the sender to reduce a rate of transmission during a retransmission.

2. The method of claim 1, wherein determining the time-rate pairs from the packet trace comprises:
   determining a window size of a tracking window, the window size specifying a number of transmitted bytes;
   sliding the tracking window along the packet trace until the tracking window encompasses the number of transmitted bytes as specified by the window size; and
   determining the time-rate pairs based on a portion of the packet trace encompassed by the tracking window.

3. The method of claim 2, wherein each of the time-rate pairs comprises a retransmission rate and a time to successfully transfer a fixed size of data based on the portion of the packet trace encompassed by the tracking window.

4. The method of claim 1, the method further comprising removing large inter-arrival times in the packet trace.

5. A system for detecting an irregular retransmission, the system comprising:
   a processor; and
   a memory for storing a program containing code that, when executed by the processor, cause the processor to perform operations comprising
      receiving a packet trace from a packet monitor positioned between a sender and a receiver, the packet trace indicating an arrival time for a data packet transmitted between a sender and a receiver,
      identifying transmitted bytes and retransmitted bytes in the packet trace,
      upon identifying the transmitted bytes and the retransmitted bytes in the packet trace, determining time-rate pairs from the packet trace,
      plotting the time-rate pairs on a rate tracking graph,
      determining a correlation coefficient based on the rate tracking graph as plotted, and
      if the correlation coefficient is less than a threshold, determining that the packet trace indicates an irregular retransmission, wherein the irregular retransmission indicates a failure of the sender to reduce a rate of transmission during a retransmission.

6. The system of claim 5, wherein determining time-rate pairs from the packet trace comprises
   determining a window size of a tracking window, the window size specifying a number of transmitted bytes,
   sliding the tracking window along the packet trace until the tracking window encompasses the number of transmitted bytes as specified by the window size, and
   determining the time-rate pairs based on a portion of the packet trace encompassed by the tracking window.

7. The system of claim 6, wherein each of the time-rate pairs comprises a retransmission rate and a time to successfully transfer a fixed size of data based on the portion of the packet trace encompassed by the tracking window.

8. A non-transitory computer-readable storage medium storing instructions that, when executed by a processor, cause the processor to perform operations comprising:
   receiving a packet trace from a packet monitor positioned between a sender and a receiver, the packet trace indicating an arrival time for a data packet transmitted between a sender and a receiver;
   identifying transmitted bytes and retransmitted bytes in the packet trace;
   upon identifying the transmitted bytes and the retransmitted bytes in the packet trace, determining time-rate pairs from the packet trace;
   plotting the time-rate pairs on a rate tracking graph;
   determining a correlation coefficient based on the rate tracking graph as plotted; and
   if the correlation coefficient is less than a threshold, determining that the packet trace indicates an irregular retransmission, wherein the irregular retransmission indicates a failure of the sender to reduce a rate of transmission during a retransmission.

9. The non-transitory computer-readable storage medium of claim 8, wherein determining the time-rate pairs from the packet trace comprises:
   determining a window size of a tracking window, the window size specifying a number of transmitted bytes;
   sliding the tracking window along the packet trace until the tracking window encompasses the number of transmitted bytes as specified by the window size; and
   determining the time-rate pairs based on a portion of the packet trace encompassed by the tracking window.

10. The non-transitory computer-readable storage medium of claim 9, wherein each of the time-rate pairs comprises a retransmission rate and a time to successfully transfer a fixed size of data based on the portion of the packet trace encompassed by the tracking window.

11. The non-transitory computer-readable storage medium of claim 8, storing further instructions that, when executed by the processor, cause the processor to perform operations comprising removing large inter-arrival times in the packet trace.

12. The method of claim 3, wherein the retransmission rate is calculated by dividing a number of retransmitted byes within the tracking window by a size of the tracking window.

13. The method of claim 1, further comprising:
   assigning, by the processor, a value of zero to each of the transmitted bytes; and
   assigning, by the processor, a value of one to each of the retransmitted bytes.

14. The method of claim 2, wherein the tracking window comprises a head and a tail.

15. The method of claim 14, wherein sliding the tracking window along the packet trace until the tracking window encompasses the number of transmitted bytes as specified by the window size comprises:
   incrementing the head by one; and
   recursively incrementing the tail by one until the tracking window encompasses a number of transmitted bytes that equals a number of bytes in the window size.

16. The method of claim 1, wherein the packet trace comprises a bidirectional packet trace.

17. The system of claim 5, wherein the packet trace comprises a bidirectional packet trace.

18. The non-transitory computer-readable storage medium of claim 8, wherein the packet trace comprises a bidirectional packet trace.

* * * * *